Patented Dec. 19, 1939

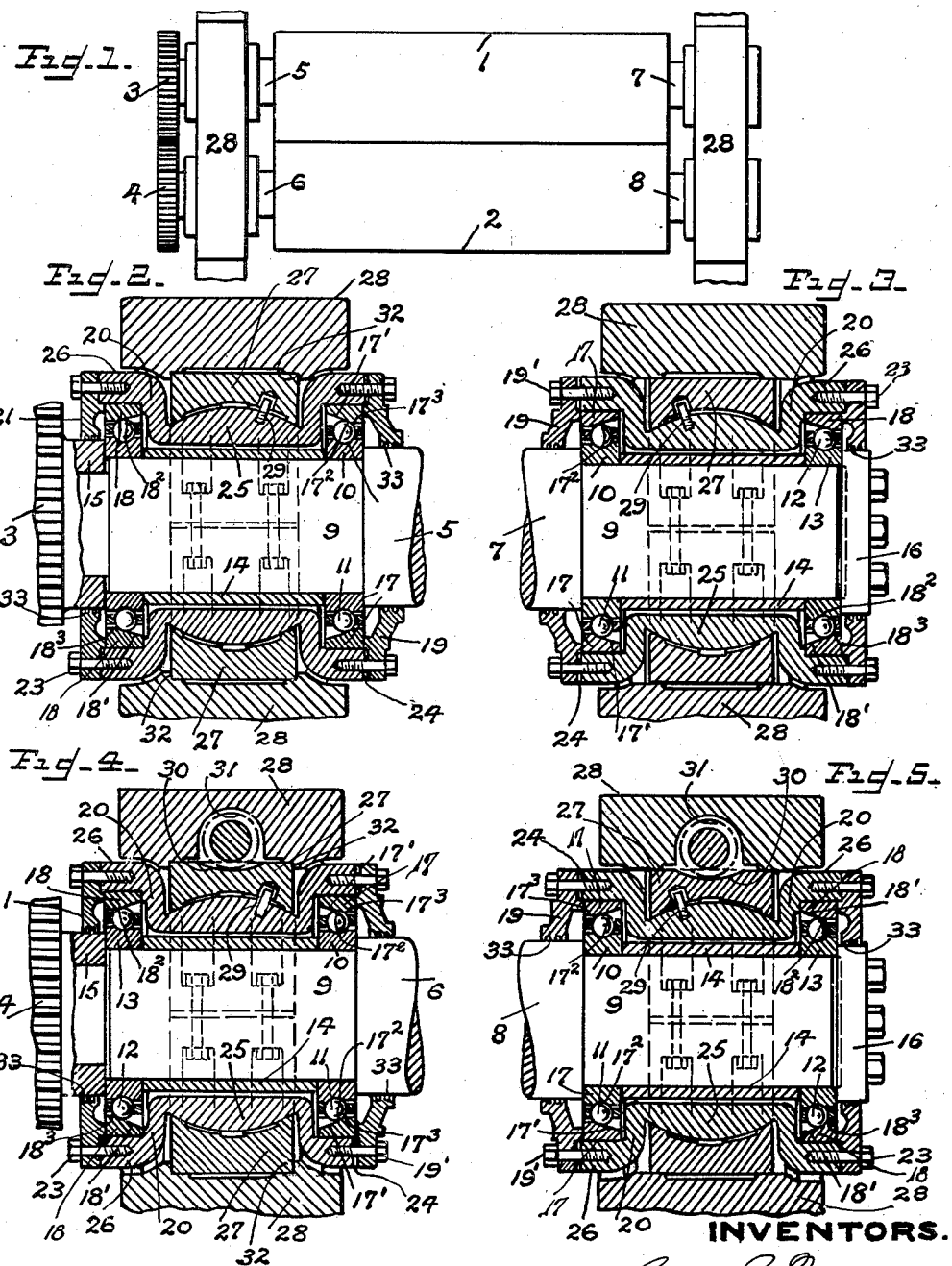

2,184,081

UNITED STATES PATENT OFFICE 2,184,081

BALL BEARING

Cecil George Quick, London, and Henry William Shadrack, Danbury, England, assignors to R. Hoe & Co., Inc., New York, N. Y., a corporation of New York Application June 2, 1936, Serial No. 83,028
In Great Britain August 10, 1935

5 Claims. (Cl. 308—189)

This invention relates to bearings of the type known as "preloaded" bearings.

According to the present invention a bearing comprises two bearing elements each consisting of an outer race, an inner race and balls between the races which are so shaped that relative axial movement between the races produces a radial compressional load on the balls, a housing member having end portions each of which is recessed from its outer end to receive the outer races and having an intermediate spherical portion, an outer supporting member having an internal spherical surface forming a seating for the spherical portion of the housing member, the said spherical portion being so reduced from the end portions that the outer supporting member extends into the zone between the said end portions, and means for enabling the relative axial position of the two races of both bearing elements to be adjusted to produce adjustment of the compressional load on the balls.

The feature that the spherical surface is formed by a reduction from the end portions to allow the outer supporting member to extend into the zone between the end portions is of importance in cases where the maximum permissible diametrical dimension of the bearing is limited: such a condition occurs in printing machinery: the diameters of the shafts of the printing and impression cylinders are a large proportion of the diameters of the cylinders themselves and hence as the distance between the centres of the shafts is fixed by the diameters of the cylinders, the space which can be occupied by bearings for the shafts is limited.

Moreover, by reason of the fact that it is possible to impose a compressional load on the balls, it is possible to take up radial clearance and thus the bearing is particularly adapted for use in machinery where radial clearances for the members supported by ball bearings are not desired: such conditions occur in printing machinery in which there are employed printing couples comprising a printing cylinder and an impression cylinder; difficulty has been experienced in preventing what is known as "stagger" which takes the form of printed matter the density of the "colour" of which varies down or along the matter. This is believed to be due at least in part to the fact that normally the bearings for the cylinders have a small running clearance and also to the fact that the periphery of the printing cylinder is not continuous but is broken by the gaps between the printing plates on the cylinders. When the gaps are presented to the impression cylinder the load on the bearings is momentarily relieved and the cylinders are permitted very slight movement towards one another by reason of the running clearance and it is believed that in this manner a vibratory or oscillatory motion is set up and intermittently varies the impression pressure and hence the density of the "colour" of the printed matter. With a bearing constructed in accordance with this invention, it is possible to "preload" the bearing (i. e., to eliminate radial clearance) and in addition the bearing is rendered "self-aligning" by the provision of the spherical surface and seating.

The invention is illustrated in the accompanying drawing as applied to a printing couple: in the drawing, Figure 1 is a diagrammatic view showing a printing couple to which the invention can be applied and Figures 2 to 5 detail longitudinal sectional views showing bearings for use with the couple shown in Figure 1.

Referring to the drawing, 1, 2 indicate the cylinders of a printing couple, these cylinders being geared together by gear wheels 3, 4 secured respectively to shaft ends 5,6 at one of the ends of cylinders, the other ends having shaft ends 7, 8. In the application of the invention shown, it is required that not only shall the bearings for the shaft ends 5, 6, 7 and 8 be "preloaded" but also that the bearings for one cylinder shall be capable of adjustment to move the particular cylinder towards or away from the other cylinder to vary the "impression" pressure: in addition, it is necessary to make provision for axial expansion or contraction of the cylinders 1, 2 and it is desirable that the axial expansion or contraction be permitted from one fixed end of the cylinders. Hence, the four bearings for the four shaft ends will all be slightly different to permit these various conditions to be met. The four bearings are shown separately in Figures 2 to 5 but each bearing has the elements now referred to.

The shaft ends are reduced as indicated at 9 to provide a shoulder against which abuts the inner race 10 of a ball bearing, the inner race being cupped to receive balls 11. A second bearing having balls 12 received in an inner race 13 is spaced from the first bearing by a distance tube 14 interposed between the two races 10, 13, and the races are clamped in position either by the boss 15 of the gear wheel 3 or 4 or by an end plate 16 bolted to the appropriate shaft end. The balls 11 are also received in an outer race 17 which has its inner or race surface comprised of a curved portion $17^a$ constituting the race proper and which is ground to a cross sectional radius of curvature which is slightly greater than the radius of curvature of the balls. The race also includes an unground surface 17', which is for convenience in manufacture formed with a taper, and also a second unground surface 17³. The balls 12 are similarly received in an outer race 18 having a curved ground portion 18² and unground portions 18', 18³. These outer races 17, 18 are received in recesses or bores in the ends 26 of a housing member 20. The outer face of the race 17 is engaged by an end plate 19 secured by bolts 19' to one end of the housing member 20, while the outer face of the race 18 is engaged by a surface on an end plate 21 which is secured by bolts 23 to the other end of the housing member 20, shims 24 being interposed between the end plate 19 and the end face of the housing member.

It will now be seen that the distance separating the outer races 17, 18 can be decreased by removing from between the plate 19 and the end face of the housing more or less shims 24, the greater the number of shims removed the greater the extent to which the outer races 17, 18 are pulled towards one another by the bolts 19': this movement of the races results in the balls 11, 12 being compressed between the races 17, 18 and the stationary races 10, 13; the bearings thus being preloaded by the elimination of radial clearance. Thus the housing 20 and the end plate 19 provide in effect a housing the effective length of which is variable to vary the preloading effect.

It will be obvious from a consideration of the drawing that the compressional load applied to the balls 11, 12 has a component transverse to the axis of the bearings.

In order to render the bearing assembly capable of self alignment, the housing 20 is formed centrally between the two bearings with a spherical portion 25 received in a spherical seating formed in a sleeve 27 which forms the outer casing of the bearing: it is to be observed that the end portions 26 are spaced such a distance apart that the spherical portion 25 can be reduced and accommodated between the two end portions. It is thus possible as is shown in the drawing to arrange that the diameter of the spherical portion does not exceed and in fact can as shown be less than the outer diameter of the end portions which are necessarily provided to receive the outer races 17, 18. This enables the sleeve 27 to extend into the zone between the end portions 26 as shown to be accommodated in this zone. It will be appreciated from a consideration of the drawing that this feature is of importance as it enables the bearings to be accommodated with ease despite the fact that the diameter of the shaft end 9 is a large proportion of the diameters of the cylinders 1 or 2, thus leaving a relatively small space available between the shaft ends. The sleeve 27 is carried in a bearing block 28 and relative rotation between the housing 20 and the sleeve 27 is prevented by a lug 29 secured to the housing 20 and extending into a recess formed in the sleeve 27, sufficient clearance being left between the lug 29 and the recess to permit the desired range of self-aligning movement.

As has been stated the features so far referred to are employed in all of the four bearings: in the case of the two bearings for one of the cylinders 1 or 2 it is necessary to provide for varying the impression pressure and this is effected by forming, as is shown in Figures 4 and 5, the outer periphery of the sleeve 27 eccentric to the axis of the bearing and mounting the sleeve 27 for rotation in the block 28: the sleeve is also formed with worm teeth 30 in mesh with a worm 31 rotatable in the bearing block and provided with a squared operating end: thus, by rotating the worm 31, the sleeve is partially rotated and the eccentric outer periphery of the sleeve causes the shaft ends to be moved transversely. The peripheries of the sleeves 27 for the other cylinder are as shown in Figures 2 and 3 concentric with respect to the axis of the bearing and of course are not provided with the worm adjustment gearing.

In order that the cylinders shall be free to expand and contract longitudinally with respect to one of their ends which shall be fixed, the sleeves 27 for the bearing assemblies at one of the ends of the cylinders are as shown in Figures 3 and 5 slidable axially in the bearing block while the sleeves 27 for the other ends of the cylinders are, as shown in Figures 2 and 4, positioned between shoulders 32 formed in the bearing blocks.

Hence, assuming that the cylinder 2 is that which is to be moved to vary the impression pressure, then the bearing assembly for one end is that shown in Figure 4 and for the other end that shown in Figure 5. For the other cylinder, the bearing assembly for one of its ends is that shown in Figure 2 and for the other end that shown in Figure 3.

The end plates 19, 21 may, as shown, extend to the shaft ends and be provided with grease receiving grooves 33.

It will now be seen that a printing couple fitted with bearings made in accordance with the invention can be preloaded by the use of shims and in this manner the tendency to produce stagger effects can be minimized or even eliminated.

It will be obvious that the feature of rendering the bearings self-aligning enables that cylinder which is provided with the eccentric adjustment to be adjusted to a position slightly out of parallelism with the other cylinder of the couple.

We claim:

1. In a bearing, the combination of spaced bearing elements, each consisting of an outer race, an inner race and anti-friction members therebetween, the outer races shaped to produce a radial compressional load on said members upon axial movement between the inner and outer races, a circumferentially extending one-piece spool-shaped housing member having end portions of the same external diameter to laterally receive in each outer end thereof one of said spaced bearing elements, the end portions also enclosing said outer races, and having a convex spherical portion extending intermediate between the inner ends of said end portions, the largest external diameter of which does not exceed the external diameter of the end portions, an outer circumferential supporting member having a concave spherical portion, said member having a width less than the space between the inner parts of said end portions and extending into said space and forming a seating for the said convex spherical portion of the one-piece housing member, with means for enabling the axial position of the two outer spaced races to be adjusted, whereby radial clearances may be eliminated, and the bearing rendered self-aligning by the provision of the said spherical surfaces.

2. A bearing comprising two bearing elements each consisting of an outer race, an inner race and balls between the races, a housing member having end portions each of which is formed to receive the outer races and having an intermediate spherical portion, an outer cylindrical supporting member surrounding the housing member and having an internal spherical surface forming a seating for the spherical portion of the housing member, said outer supporting member having an outer diameter substantially equal to the diameter of said end portions, the said spherical portion being so reduced from the end portions that the supporting member extends into the zone between the said end portions, and a bearing block having an opening therein to receive the supporting member and of a diameter to permit axial movement of said end portions of the housing member therethrough.

3. A bearing assembly for a rotatable shaft including spaced ball bearings having inner races secured to the shaft and outer races secured to a housing member, a spherically formed portion in the section of the housing member between the bearings, a cylindrical supporting sleeve surrounding the housing member and having an internal spherically formed seat fitting the spherical section of the housing member, and thereby supporting the housing member between the bearings in a manner permitting self-alignment, and a stationary support for said sleeve having a cylindrical bore in which said sleeve is fitted, the diameters of said housing member and said sleeve being substantially equal whereby the sleeve and the housing member with said inner and outer races may be simultaneously and axially removed from said stationary support through the opening therein.

4. In a bearing assembly for a printing machine having a printing cylinder shaft rotatably supported in a bearing block by a pair of antifriction bearings each including an inner ring, an outer ring, and revolving members therebetween; means for securing the inner bearing rings in spaced relation on the shaft, a cylindrical housing having relatively large ends recessed to support the outer bearing rings in operating alignment with the inner rings and a relatively small mid-portion having a spherically shaped surface extending around it, and a split sleeve surrounding the mid-portion of the housing with its inner surface fitted to the spherical surface of the housing and having its outer surface fitted to an opening in the bearing block, the distance between opposite sides of the outer surface of the sleeve being substantially the same as the outside diameter of the ends of the housing.

5. In a bearing assembly for a printing machine having a printing cylinder shaft rotatably supported in a bearing block by a pair of antifriction bearings each including an inner ring, an outer ring, and revolving members therebetween; means for securing the inner bearing rings in spaced relation on the shaft, a cylindrical housing having relatively large ends recessed to support the outer bearing rings in operating alignment with the inner rings and a relatively small mid-portion having a spherically shaped surface extending around it, clamping means for securing the outer rings in the housing to preload the bearings, and a split sleeve surrounding the mid-portion of the housing with its inner surface fitted to the spherical surface of the housing and having its outer surface fitted to a bore in the bearing block, the distance between opposite sides of the outer surface of the sleeve being substantially the same as the outside diameter of the ends of the housing.

CECIL GEORGE QUICK.
HENRY WILLIAM SHADRACK.